No. 719,059. PATENTED JAN. 27, 1903.
J. A. TABOR.
LITTER.
APPLICATION FILED AUG. 2, 1902.
NO MODEL. 2 SHEETS—SHEET 1.

Witnesses
Inventor
Joseph A. Tabor.
By
Attorneys

No. 719,059. PATENTED JAN. 27, 1903.
J. A. TABOR.
LITTER.
APPLICATION FILED AUG. 2, 1902.
NO MODEL. 2 SHEETS—SHEET 2.
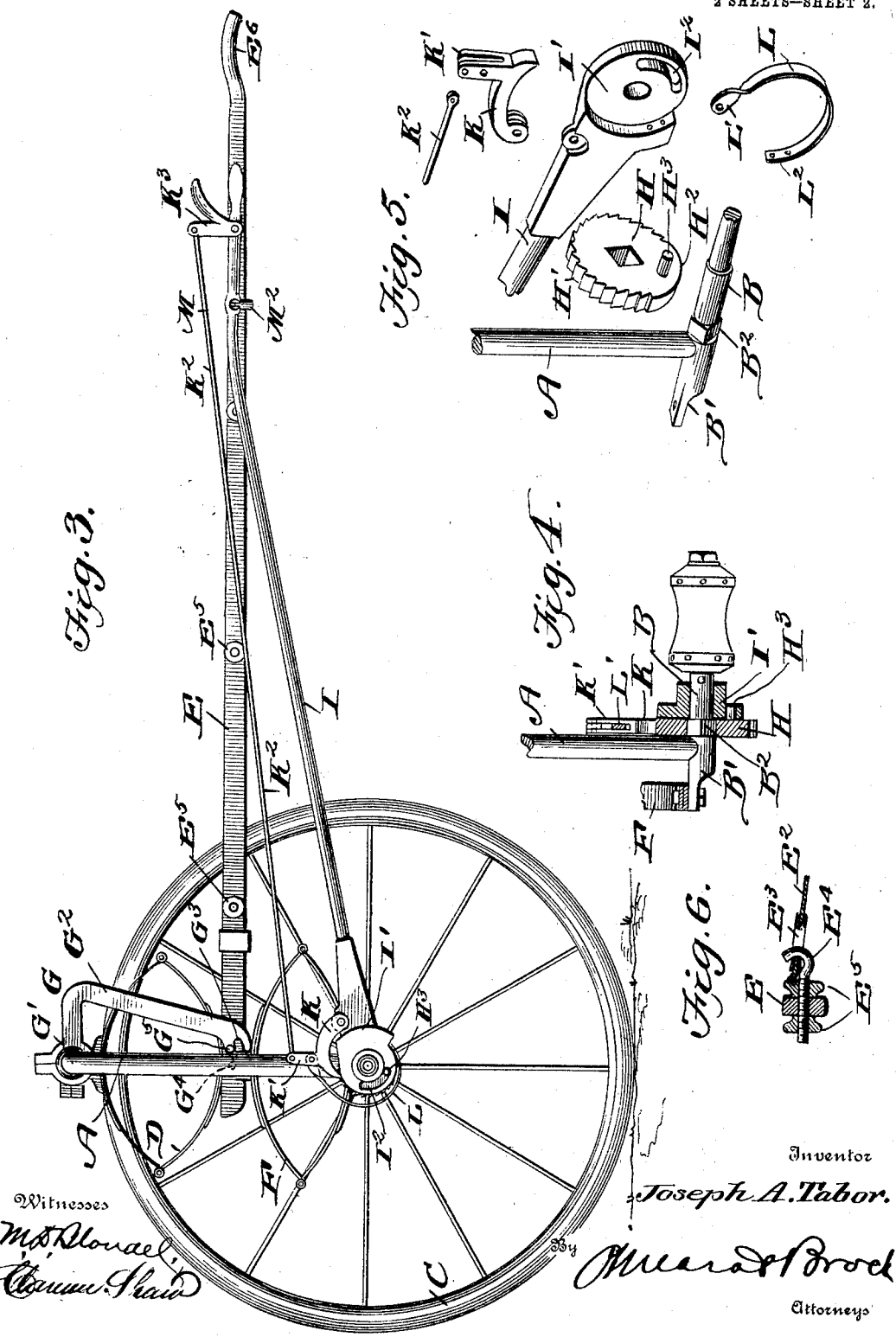
Witnesses
Inventor
Joseph A. Tabor.
Attorneys

UNITED STATES PATENT OFFICE.

JOSEPH A. TABOR, OF SCRANTON, MISSISSIPPI.

LITTER.

SPECIFICATION forming part of Letters Patent No. 719,059, dated January 27, 1903.

Application filed August 2, 1902. Serial No. 118,177. (No model.)

*To all whom it may concern:*

Be it known that I, JOSEPH A. TABOR, a citizen of the United States, residing at Scranton, in the county of Jackson and State of Mississippi, have invented a new and useful Improvement in Litters, of which the following is a specification.

This invention relates generally to litters, and more particularly to a portable litter particularly adapted for field use, the object being to provide a litter which can be quickly and easily rolled from place to place, one capable of use where a larger and four-wheeled vehicle would be impossible, and one which can be manipulated by a single attendant.

Another object of the invention is to provide a litter of this kind which will be spring-supported, and will therefore carry the patient with the least jar or inconvenience.

Another object of the invention is to provide a litter of this kind which can be lowered flat upon the ground, so that the patient can be easily placed thereon; and a still further object is to provide means for easily elevating the litter to the proper position for transportation.

With these and certain other objects in view the invention consists in various details of construction and novelties of combination, all of which will be fully described hereinafter and pointed out in the claims.

Figure 1:
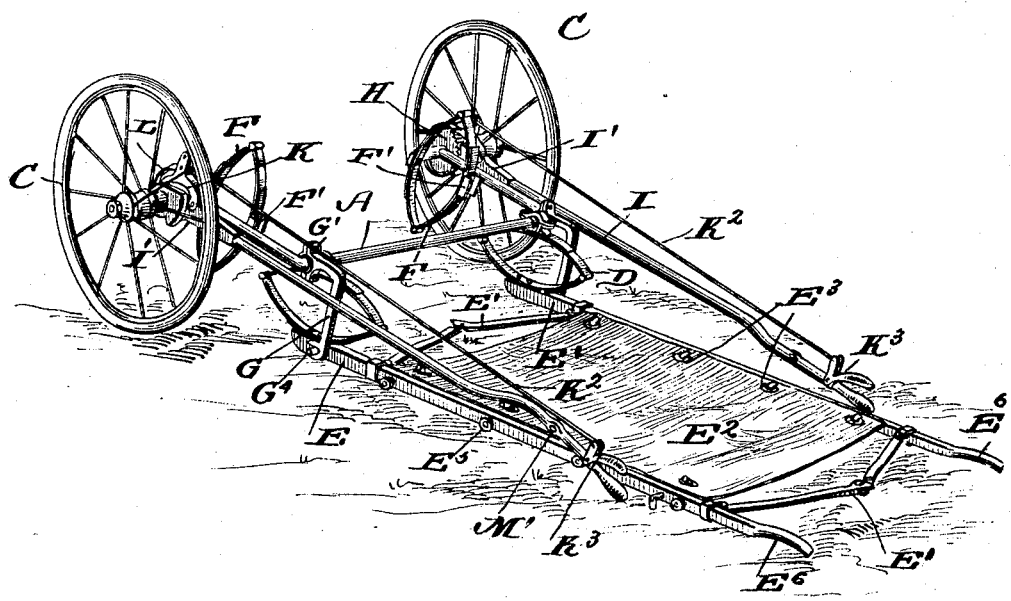
Figure 2:
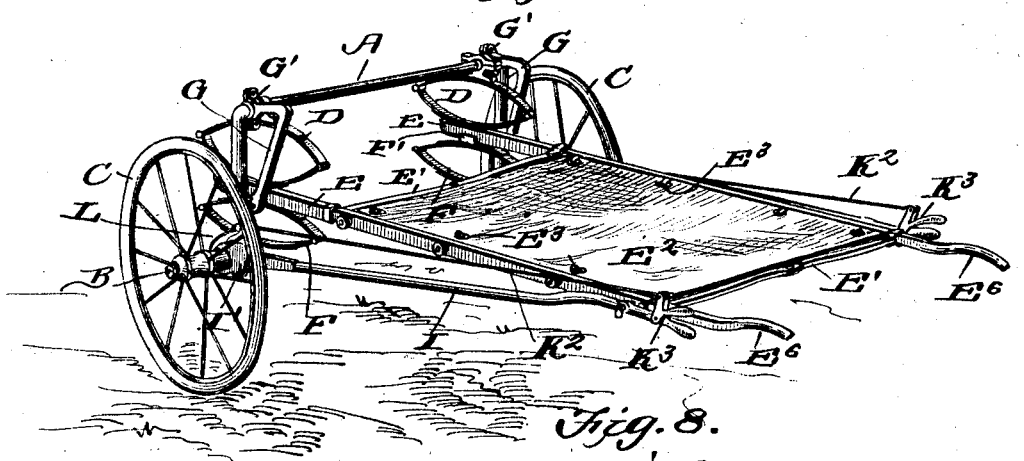
Figures 7, 8:
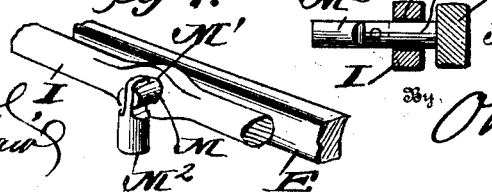

In the drawings forming part of this specification, Figure 1 is a perspective view of a litter constructed in accordance with my invention, the litter-frame being lowered to the ground ready to receive the patient. Fig. 2 is a perspective view showing the litter raised and locked ready for transportation. Fig. 3 is a side elevation, one of the wheels being removed to clearly illustrate the details of construction. Fig. 4 is a detail sectional view of the pawl-and-ratchet mechanism for raising and lowering the frame carrying the litter. Fig. 5 is a view showing in detail a stub-axle with a portion of the arched frame connected thereto and also the ratchet-disk lever-head, pawl, and spring. Fig. 6 is a detail sectional view showing the manner of connecting the canvas to the litter-frame. Fig. 7 is a detail perspective view illustrating the manner of locking the lever to the frame. Fig. 8 is a detail sectional view of such means.

In constructing a litter in accordance with my invention I employ an arched frame A, preferably constructed of strong metal tubing, and to the lower ends of said arched frame are connected the stub-axles B, upon which are mounted the wheels C, said wheels being preferably constructed with pneumatic or cushion tires, the steel-wire spokes, and ball-bearing hubs. Oval-shaped springs D are pivotally connected to the upper member of the arched frame, said springs being rigidly connected to the side bars E of the litter-frame, said side bars being connected by means of the stretcher-bars E'. The canvas $E^2$ has eyelets $E^3$ arranged adjacent to the side edges, which eyelets are adapted to engage the hooks $E^4$, which have threaded shanks passing through the side bars and secured by means of nuts $E^5$, arranged upon both sides of the said side bars, and by means of these nuts the hooks can be adjusted so as to securely fasten the canvas to the stretcher. The side bars E are extended a considerable distance beyond the stretcher or spreader bars E' and are shaped into handles $E^6$. The side bars of the litter-frame are also preferably constructed of tubing, although they may be made solid, if so desired, and, furthermore, may be made of any suitable material. Springs F, similar in construction to the springs D, are rigidly connected to the inwardly-extending portion B' of the stub-axle, and each spring F has a seat or rest F' riveted upon the upper side of its upper member, said rest or seat being essentially a U-shaped clip, which is adapted to receive the rear ends of the side bars E when the litter-frame is elevated and locked for transportation, as most clearly shown in Figs. 1 and 3.

When it is desired to place the patient upon the litter, the frame is lowered to the ground, as most clearly shown in Fig. 1, the canvas having been first detached from the litter-frame and the patient placed thereon, and when the litter-frame is lowered it is lowered directly over the canvas, and the side edges of the canvas are then quickly and easily connected to the side bars of the litter-frame and the stretcher or spreader bars E' spread outwardly.

In order to take away the strain from the springs D during the raising and lowering operations of the litter-frame, I provide depending hangers G, pivotally suspended from the arched frame A, as shown at G', bent downwardly, as shown at $G^2$, and bifurcated at the lower end, as shown at $G^3$, for the purpose of engaging laterally-projecting pins $G^4$, carried by the side bars. These hangers G are made angular in shape, as shown, so that the bifurcated ends will engage the laterally-projecting pins $G^4$ the moment the arched frame is tilted and the litter-frame begins to descend. As the litter-frame is raised the hangers are disengaged from the pins $G^4$ by means of the laterally-projecting pins $G^5$, carried by the hangers coming in contact with the upright members of the arched frame.

Having described the construction of the litter-frame and the means for supporting the same, I shall now describe the means for raising and lowering and locking the said frame in connection with its support.

Each stub-axle B is provided with a squared portion $B^2$ between the arched frame and the wheel-hub, and mounted upon said squared portion is a disk H, having ratchet-teeth H', extending partly around its periphery, the remaining portion of its periphery $H^2$ being smooth. Each disk H is also provided with an outwardly-projecting pin $H^3$. Levers I are arranged upon each side of the litter-frame, said levers having notched heads I', perforated centrally to fit upon the rounded portion of the stub-axle adjacent to the ratchet-disk and between the said disk and hub of the wheel C. Each head is cut away upon the inner side for the purpose of receiving the said ratchet-disk, and this head I' is also provided with a curved slot $I^2$, which is intended to receive the pin $H^3$, and limits the movements of the arched frame. A pawl K is pivoted to each lever-head I' upon the upper side thereof, said pawl being adapted to receive the ratchet-teeth H' of the disk H. Each pawl K has an upwardly-extending bifurcated arm K', to the upper end of which is connected the rod $K^2$, which in turn is connected to the thumb-latch $K^3$, pivoted to the rear end of the lever I. A spring-band L is pivotally connected to the bifurcated arm K' at L', said band encircling the disk H and connected at $L^2$ to the lower side of the head I' of the lever. Each lever I is secured to its adjacent side bars E of the litter by means of a locking-pin M, which passes through an aperture M' produced in the lever, said locking-pin having the pivoted end $M^2$, which is turned down after having been passed through the aperture M', as most clearly indicated in Fig. 7.

The parts are shown in their normal positions in Figs. 2 and 3, and by grasping the handles $E^6$ the litter can be quickly and easily rolled to the patient. As before stated, the canvas is first placed upon the ground and the patient placed thereon, and the litter-frame is then lowered for the purpose of connecting the canvas to the frame. In order to lower the litter-frame, the levers I are disconnected from the side bars of the frame, and by pressing upon the thumb-catches $K^3$ the rods $K^2$ are drawn rearwardly, disengaging the pawls K from the ratchet-teeth H', and by pushing forwardly upon the levers E' the arched frame is turned and brought down to the position indicated in Fig. 1, the slot $I^2$ and pin $H^3$ limiting the movement of the said arched frame, and by continuing the pressure upon the catches $K^3$ after the pawl has been disengaged the spring-band L is brought into engagement with the smooth portion $H^2$ of the disk H, and thereby serving as a friction-band to prevent too sudden a descent of the axle and frame. During the descent of the litter-frame the hangers support the rear end of said frame, and thereby relieve the springs D of strain. The canvas being connected to the litter-frame, the said frame is raised to its normal position by alternately raising and lowering the levers I at each side of the frame, and by the engagement of the pawls K with the ratchet-teeth H' of disk H the arched frame is brought back to its vertical position, carrying with it the litter-frame, and the hangers G still support and lift the rear end of said frame, thus relieving the springs D of all strain during such lifting operation. The rear ends of the side bars are guided into the rests or seats F', and levers I are then locked to the side bars of the litter-frame by the locking-pins M. The attendant then grasps the handle $E^6$, and the litter, with the patient thereon, can be rolled either to the field-hospital or to the ambulance. It will be noted that a single attendant is all that is necessary, and by having the litter mounted upon two wheels only it can be rolled over any character of ground, and inasmuch as the litter-frame is supported both above and below by springs it is obvious that all jarring incidental to rolling will be taken up, thus insuring ease and comfort to the patient.

Having thus fully described my invention, what I claim as new, and desire to secure by Letters Patent, is—

1. A portable litter comprising an arched frame suitably mounted, a litter-frame supported at one end by the said arched frame, springs interposed between the arched and litter frames, and means for raising, lowering and locking the said arched and litter frames, as specified.

2. A portable litter comprising an arched frame suitably mounted, a litter-frame supported at one end by the said arched frame, springs interposed between the arched and litter frames, hangers connected to the arched frame, and adapted to engage the litter-frame, and means for raising, lowering and locking the arched and litter frames.

3. A portable litter comprising an arched frame suitably mounted, a litter-frame, springs connecting the upper portion of the arched frame, springs connected to the lower portion of the arched frame and upon which the litter-frame rests, hangers carried by the arched frame and adapted to engage the litter-frame during its raising and lowering movements, and means for raising and lowering and locking the arched and litter frames, as specified.

4. The combination with the arched frame suitably mounted, of the springs connected thereto, the lever-frame connected to one set of springs and adapted to rest upon the other set, pawl-and-ratchet and lever mechanism connected to the arched frame for the purpose of raising and lowering the same, and means for connecting the levers to the litter-frame, as specified.

5. The combination with the arched frame suitably supported, of the springs connected thereto, a litter-frame connected to one set of springs and adapted to rest upon the other set of springs, hangers carried by the arched frame, and adapted to engage the lever-frame, levers pivotally connected to the arched frame, pawls carried thereby, the ratchet-disks rigidly connected to the arched frame, spring-bands carried by the levers encircling the ratchet-disks, and connected to the pawls, and the operating-rods and pivoted catches; together with means for locking the levers to the litter-frame, as specified.

6. In a device of the kind described, the combination with the swinging arched frame, of the springs connected thereto, the litter-frame connected to the springs, and the angular pendent hangers bifurcated at their lower ends and adapted to engage the laterally-projecting pins carried by the litter-frame, as specified.

7. In a device of the kind described, the combination with a stub-axle, of a ratchet-disk rigidly mounted thereon, a portion of said disk being free from ratchet-teeth, a laterally-projecting pin carried by the disk, a lever pivoted upon the said stub-axle, the head of such axle having a slot adapted to receive the said pin, a pawl pivoted to the lever and adapted to engage the ratchet-teeth, a spring-band connected at one end to the pawl and the opposite end being connected to the head of the lever, said band partially encircling the ratchet-disk, and means for operating the said pawl, substantially as set forth.

JOSEPH A. TABOR.

Witnesses:
T. J. O'CONNOR,
WILLIAM J. JOEL.